US008886816B2

(12) United States Patent
Daniel

(10) Patent No.: US 8,886,816 B2
(45) Date of Patent: Nov. 11, 2014

(54) AUTO-DETECTION AND SELECTION OF AN OPTIMAL I/O SYSTEM RESOURCE VIRTUALIZATION PROTOCOL

(76) Inventor: David A. Daniel, Scottsdale, AZ (US)

( * ) Notice: Subject to any disclaimer, the term of this patent is extended or adjusted under 35 U.S.C. 154(b) by 957 days.

(21) Appl. No.: 12/653,797

(22) Filed: Dec. 18, 2009

(65) Prior Publication Data

US 2010/0161814 A1    Jun. 24, 2010

Related U.S. Application Data

(60) Provisional application No. 61/203,618, filed on Dec. 24, 2008.

(51) Int. Cl.
*G06F 15/16* (2006.01)
*G06F 9/455* (2006.01)
*H04L 29/06* (2006.01)

(52) U.S. Cl.
CPC ............ *G06F 9/45558* (2013.01); *H04L 69/16* (2013.01); *G06F 2009/45595* (2013.01); *H04L 69/161* (2013.01)
USPC .......................................................... 709/228

(58) Field of Classification Search
CPC .... G06F 9/45558; H04L 69/161; H04L 69/16

USPC .......................................................... 709/228
See application file for complete search history.

(56) References Cited

U.S. PATENT DOCUMENTS

| 7,783,818 | B1 * | 8/2010 | Sardella et al. | 710/313 |
| 7,895,348 | B2 * | 2/2011 | Twitchell, Jr. | 709/230 |
| 2007/0043860 | A1 * | 2/2007 | Pabari | 709/224 |

* cited by examiner

*Primary Examiner* — David X Yi
(74) *Attorney, Agent, or Firm* — Robert C. Klinger

(57) ABSTRACT

A means for automatic detection and selection of an optimal I/O system resource virtualization protocol. The invention is a solution for the problem of complexity and the resulting lack of optimization in I/O system resource virtualization implementations. The invention shields the user from the complexity of network analysis and allows the engaging of multiple I/O system resource virtualization protocols—as opposed to a single protocol. The invention enables automatic detection and selection of an optimal I/O system resource virtualization protocol on a per resource basis, which is a unique capability and something that has not been accomplished in the prior art. The net result is a simplified user experience and optimized performance when using virtualized I/O system resource.

16 Claims, 11 Drawing Sheets

FIG. 6

| HOST IDs (IP Address) | REMOTE I/O RESOURCE AVAILABLE TO HOSTS | | |
|---|---|---|---|
| | IP ADDRESS OF I/O RESOURCE | POSSIBLE PROTOCOLS TO ACCESS I/O RESOURCE | SELECTED OPTIMAL PROTOCOL TO ACCESS I/O RESOURCE |
| 192.168.0.4 | 192.168.0.4 192.168.0.5 | PCIe IOV i-PCI (software-only) | PCIe IOV |
| 192.168.0.4 | 192.168.0.57 | i(e)-PCI i-PCI | i(e)-PCI |
| 192.168.0.4 | 74.125.67.100 | i-PCI | i-PCI |
| 192.168.0.8 | 192.168.0.57 | i(e)-PCI i-PCI | i(e)-PCI |
| 192.168.0.8 | 74.125.67.100 | i-PCI | i-PCI |
| 192.168.0.16 | 192.168.0.16 | i(dc)-PCI i(e)-PCI | i(dc)-PCI |
| 192.168.0.16 | 192.168.0.57 | i(e)-PCI i-PCI | i(e)-PCI |
| 192.168.0.16 | 74.125.67.100 | i-PCI | i-PCI |

FIG. 7

| HOST ID (IP Address) | REMOTE I/O RESOURCE AVAILABLE TO THE HOST | | |
|---|---|---|---|
| | IP ADDRESS OF I/O RESOURCE | POSSIBLE PROTOCOLS TO ACCESS I/O RESOURCE | SELECTED OPTIMAL PROTOCOL TO ACCESS I/O RESOURCE |
| 192.168.0.16 | 192.168.0.16 | i(dc)-PCI<br>i(e)-PCI | i(dc)-PCI |
| 192.168.0.16 | 192.168.0.57 | i(e)-PCI<br>i-PCI | i(e)-PCI |
| 192.168.0.16 | 74.125.67.100 | i-PCI | i-PCI |

FIG. 9

```
Intialize: Host1_IPAddr, Host2_IPAddr, IO_IPAddr, Possible1, Possible2, Select,
          Host1_Pairing
READ Host1_IPAddr, Host2_IPAddr, IO_IPAddr
IF (Host1_IPAddr == IO_IPAddr) && (Host2_IPAddr == IO_IPAddr) THEN
        /* two hosts physically share the same I/O resource */
        Possible1 = "PCIe IOV"
        Possble2 = "i-PCI (Software Only)"
        Select = "PCIe IOV"
ELSE IF Host1_IPAddr == IO_IPAddr THEN
        Possible1 = "i(dc)-PCI"
        Possble2 = "i(e)-PCI"
        Select = "i(dc)-PCI"
ELSE IF (HostIPAddr & 255.255.255.0) == (StorageIPAddr & 255.255.255.0)
        Possible1 = "i(e)-PCI"
        Possible2 = "i-PCI"
        Select = "i(e)-PCI"
ELSE
        Possible1 = "i-PCI"
END IF
Host1_Pairing [3] = {Host1_IPAddr, IO_IPAddr, Select}
```

FIG. 11

| State | Description |
|---|---|
| 0 | Boot Up: Host boots up or resets/reboots and performs built-in self test and saves results for diagnostic purposes. Ethernet auto-negotiation completes. |
| 1 | Probe: DICP probes the network, via a broadcast on the LAN, to determine if there are any other Hosts already acting as a DICP server. |
| 2 | Un-initialized DICP Server Mode: System Data Transfer Optimization Utility runs based on pre-configured settings. Mappings of network topology are stored. |
| 3 | Un-initialized DICP Client Mode: Obtain mappings of remote I/O resources from DICP Server. |
| 4 | Initialized DICP Server Mode: Ready for normal operation based on defaults. |
| 5 | Initialized DICP Client Mode: Ready for normal operation based on defaults. |
| 6 | DICP Server Mode Admin Override: Administrator optionally adjust default configuration. |
| 7 | DICP Client Mode Override: Administrator optionally adjust default configuration. |
| 8 | DICP Client Normal Operation: Host utilizes optimal I/O virtualization protocol on a "per remote resource" basis. |
| 9 | DICP Server Normal Operation: Host utilizes optimal I/O virtualization protocol on a "per remote resource" basis and responds to client probes. |

AUTO-DETECTION AND SELECTION OF AN OPTIMAL I/O SYSTEM RESOURCE VIRTUALIZATION PROTOCOL

CLAIM OF PRIORITY

This application claims priority of U.S. Provisional Patent Application Ser. No. 61/203,618 entitled "HOST BUS ADAPTER AUTO-DETECTION AND SELECTION OF AN OPTIMAL SYSTEM RESOURCE VIRTUALIZATION PROTOCOL" filed Dec. 24, 2008, the teachings of which are incorporated herein by reference.

FIELD OF THE INVENTION

The present invention relates to virtualization of computer resources via high speed data networking protocols.

BACKGROUND OF THE INVENTION

There are two main categories of virtualization: 1) Computing Machine Virtualization 2) Resource Virtualization.

Computing machine virtualization involves definition and virtualization of multiple operating system (OS) instances and application stacks into partitions within a host system.

Resource virtualization refers to the abstraction of computer peripheral functions. There are two main types of Resource virtualization: 1) Storage Virtualization 2) Memory-Mapped I/O Virtualization.

Storage virtualization involves the abstraction and aggregation of multiple physical storage components into logical storage pools that can then be allocated as needed to computing machines. An example of storage virtualization is the iSCSI protocol.

Examples of Memory-Mapped I/O Virtualization are exemplified by PCI Express and applicant's i-PCI technology.

PCIe I/O Virtualization (IOV)

The PCI Special Interest Group (SIG) has defined single root and multi-root I/O virtualization sharing specifications. Of specific interest is the multi-root specification. The multi-root specification defines the means by which multiple hosts, executing multiple systems instances on disparate processing components, may utilize a common PCI Express (PCIe) switch in a topology to connect to and share common PCI Express resources.

The PCI Express resources are accessed via a shared PCI Express fabric. The resources are typically housed in a physically separate enclosure or card cage. Connections to the enclosure are via a high-performance short-distance cable as defined by the PCI Express External Cabling specification. The PCI Express resources may be serially or simultaneously shared.

A key constraint for PCIe I/O virtualization is the severe distance limitation of the external cabling. There is no provision in PCIe I/O for the utilization of networks for virtualization.

i-PCI

This technology of the present applicant builds and expands on technology introduced as "i-PCI" in commonly assigned copending U.S. patent application Ser. No. 12/148,712, the teachings of which are incorporated herein by reference. This patent application presents i-PCI as a new technology for extending computer systems over a network. The disclosed i-PCI protocol includes a hardware, software, and firmware architecture that collectively enables virtualization of host memory-mapped I/O systems. For a PCI-based host, this involves extending the PCI I/O system architecture based on PCI Express.

The i-PCI protocol advantageously extends the PCI I/O System via encapsulation of PCI Express packets within network routing and transport layers and Ethernet packets and then utilizes the network as a transport. The network is made transparent to the host and thus the remote I/O appears to the host system as an integral part of the local PCI system architecture. The result is a virtualization of the host PCI System. The i-PCI protocol allows certain hardware devices (in particular I/O devices) native to the host architecture (including bridges, I/O controllers, and I/O cards) to be located physically remote to the host. FIG. 1 shows a detailed functional block diagram of a typical host system connected to multiple remote I/O chassis using i-PCI. An i-PCI host bus adapter card [101] installed in a host PCI Express slot [102] interfaces the host to the network. An i-PCI remote bus adapter card [103] interfaces the remote PCI Express bus resources to the network.

There are three basic implementations of i-PCI:

1. i-PCI: This is the TCP/IP implementation, utilizing IP addressing and routers. This implementation is the least efficient and results in the lowest data throughput of the three options, but it maximizes flexibility in quantity and distribution of the I/O units. FIG. 2 depicts an i-PCI IP-based network implementation block diagram.

2. i(e)-PCI This is the LAN implementation, utilizing MAC addresses and Ethernet switches. This implementation is more efficient than the i-PCI TCP/IP implementation, but is less efficient than i(dc)-PCI. It allows for a large number of locally connected I/O units. Refer to FIG. 3 for an i(e)-PCI MAC-Address switched LAN implementation block diagram.

3. i(dc)-PCI. Referring to FIG. 4, this is a direct physical connect (802.3an) implementation, utilizing Ethernet CAT-x cables. This implementation is the most efficient and highest data throughput option, but it is limited to a single remote I/O unit. The standard implementation currently utilizes 10 Gbps Ethernet (802.3ae) for the link [401], however, there are two other lower performance variations. These are designated the "Low End" LE(dc) or low performance variations, typically suitable for embedded or cost sensitive installations:

The first low end variation is LE(dc) Triple link Aggregation 1 Gbps Ethernet (802.3ab) [402] for mapping to single-lane 2.5 Gbps PCI Express [403] at the remote I/O.

A second variation is LE(dc) Single link 1 Gbps Ethernet [404] for mapping single-lane 2.5 Gbps PCI Express [405] on a host to a legacy 32-bit/33 MHz PCI bus-based [406] remote I/O.

Software-only implementations of i-PCI enable i-PCI capability for applications where an i-PCI host bus adapter and/or remote bus adapter may not be desirable or feasible. Software-only implementations trade off relative high performance for freedom from physical hardware requirements and constraints. Software-only i-PCI also allows remote access to PCIe IOV resources via host-to-host network connections.

Automatic Configuration Protocols:

Automatic Configuration Protocols are part of the current art. There have been several automatic configuration protocols introduced over recent years, typically as a lower-level protocol that is part of a higher standard. These include:

Universal Serial Bus (USB) with its ability to automatically detect and configure devices via a "surprise" attach/detach event.

PCI and PCI Express, with its non-surprise or signaled "hot plug" insertion/removal capability.

Bootp, as a part of UDP, used as a means for a client to automatically have its IP address assigned.

Reverse Address Resolution Protocol (RARP), part of TCP/IP, used as a means for a host system to obtain its IP or network address based on its Ethernet or data link layer address.

Address Resolution Protocol (ARP), part of TCP/IP, used as a protocol by which a host may determine another host's Ethernet or data link layer address based on the IP or network address it has for the host.

Dynamic Host Configuration Protocol (DHCP), as part of TCP/IP, which allows network devices to be added through automating the assignment of various IP parameters, including IP addresses.

In the current state of the art, there are multiple I/O system virtualization standards. In order to make the best choice among the standards for a given application, the user has to inspect the computer architecture and network topology, note the physical location of the targeted I/O resources relative to the host, and understand the possible protocols that could be used to virtualize the I/O resources to achieve the best performance (i.e. highest data rate, lowest latency). The level of expertise and the time required to complete a study of the computer system and network to achieve the best data transfers is too time consuming. As a result, most users must rely on computer system and networking experts or simply default their configuration to a single I/O virtualization protocol—which typically is not ideal for all their I/O resources

SUMMARY OF THE INVENTION

The present invention achieves technical advantages as a new means for automatic detection and selection of an optimal I/O system resource virtualization protocol. The invention is a solution for the problem of complexity and the resulting lack of optimization in I/O system resource virtualization implementations. The invention shields the user from the complexity of computer and network analysis and allows the engaging of multiple I/O system resource virtualization protocols—as opposed to a single protocol. The invention enables automatic detection and selection of an optimal I/O system resource virtualization protocol on a per resource basis, which is a unique capability and something that has not been accomplished in the prior art. The net result is a simplified user experience and optimized performance when using virtualized I/O system resources.

BRIEF DESCRIPTION OF THE DRAWINGS

FIG. 6 shows the Remote I/O Resource Associations established and maintained in table format on the DICP server;

FIG. 7 shows the construction of the Protocol Pairings table, a version of which is stored on each client system;

FIG. 9 details the pseudo-code for the pairing algorithm;

FIG. 11 summarizes the state descriptions associated with the various DICP states.

DETAILED DESCRIPTION OF THE PRESENT INVENTION

One embodiment of the invention is a means for automatic detection and selection of an optimal I/O system resource virtualization protocol. One aspect of the invention includes a new protocol designated "Dynamic I/O Configuration Protocol" (DICP). DICP is applicable for use in extended system network applications where multiple I/O system resource virtualization protocols are implemented including, but not limited to, PCIe I/O Virtualization (IOV), i-PCI, i(e)-PCI, and i(dc)-PCI and its variants.

Note: i-PCI, i(e)-PCI, i(dc)-PCI and its variants are as described in commonly assigned U.S. patent application Ser. No. 12/148,712, the teachings of which are incorporated herein by reference.

The new protocol described in this application, DICP, enables automatic detection and selection of an optimal I/O system resource virtualization protocol on a per resource basis, based on various factors, including the network topology, location of the I/O system resource devices in relation to the topology, and the available I/O system resource virtualization protocols.

Figure 1:
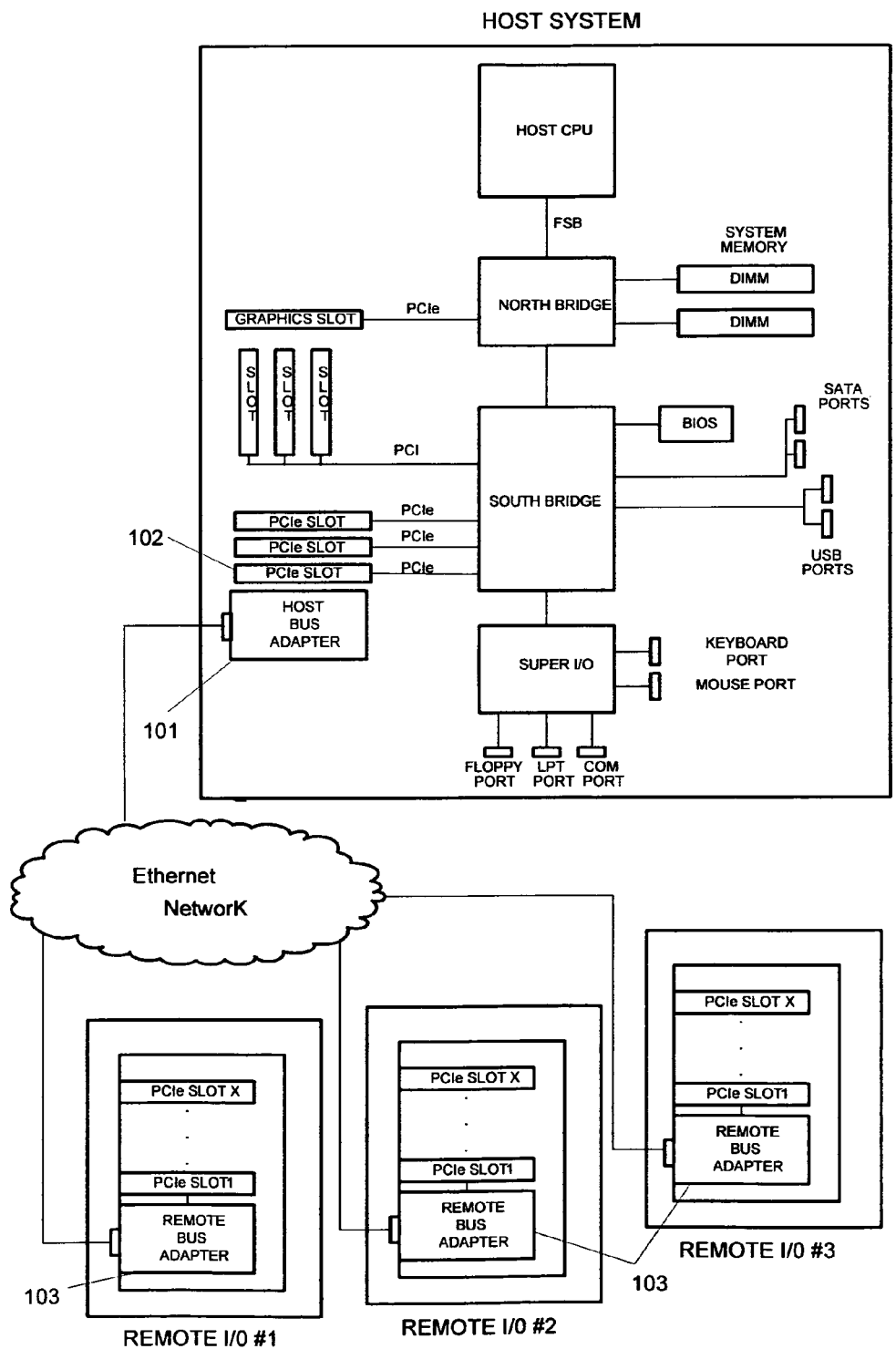
FIG. 1 shows a detailed functional block diagram of a typical host system connected to multiple remote I/O chassis implementing i-PCI.
Figure 2:
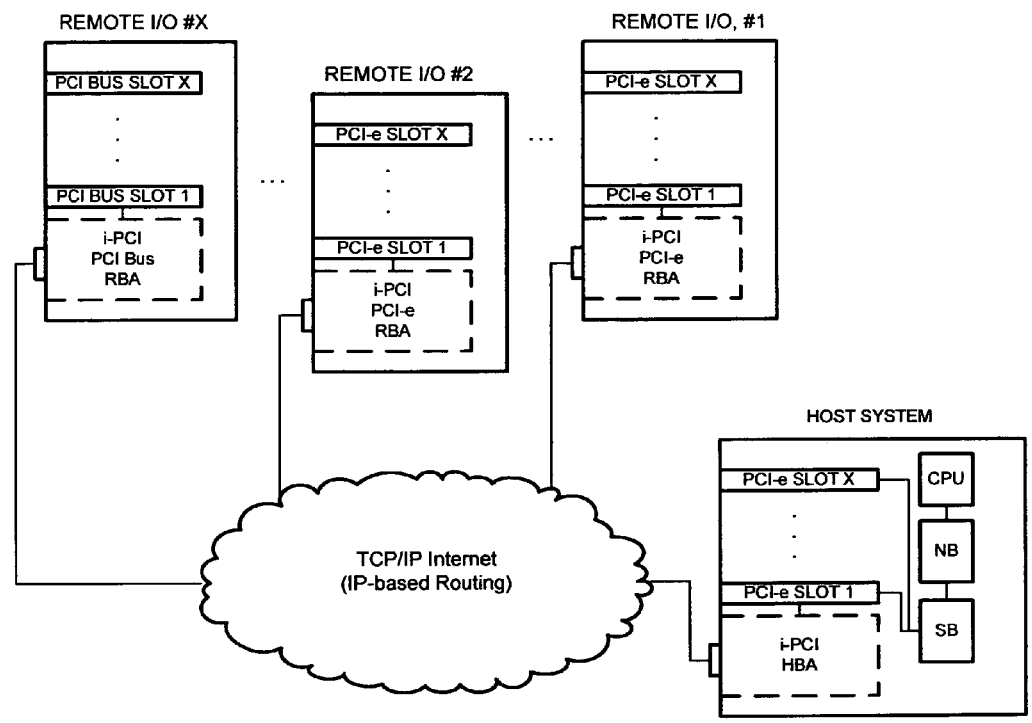
FIG. 2 is a block diagram of an i-PCI IP-based network implementation.
Figure 3:
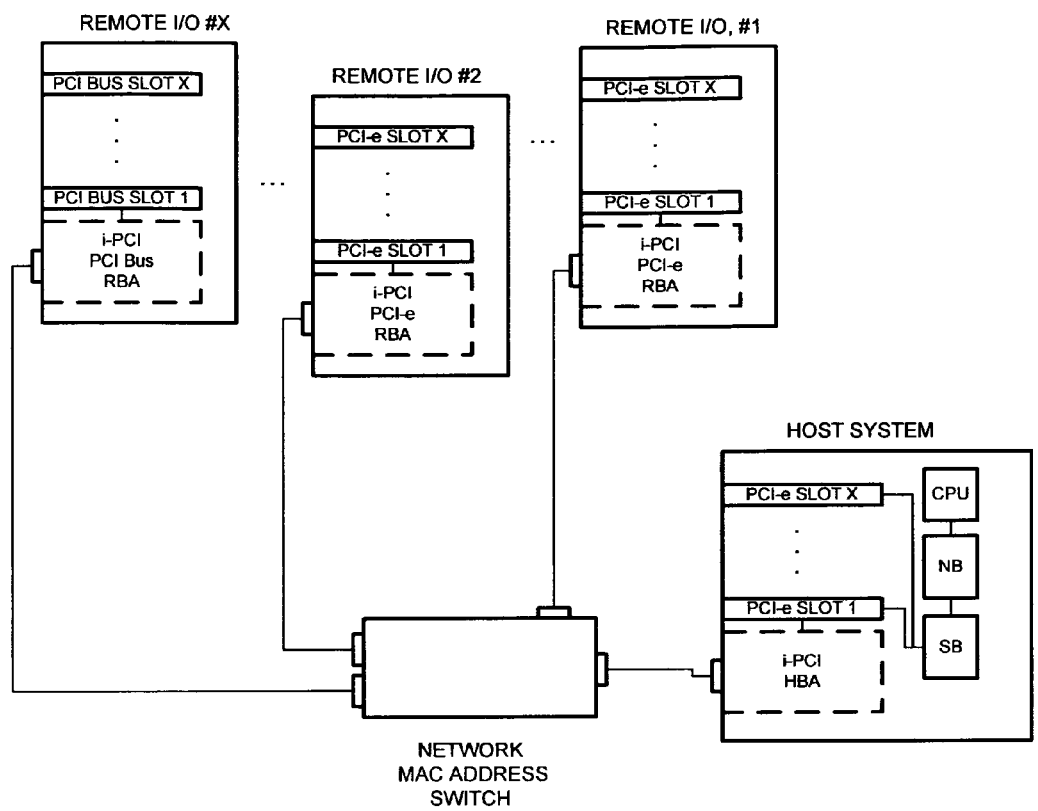
FIG. 3 is a block diagram of an, i(e)-PCI MAC-Address switched LAN implementation.
Figure 4:
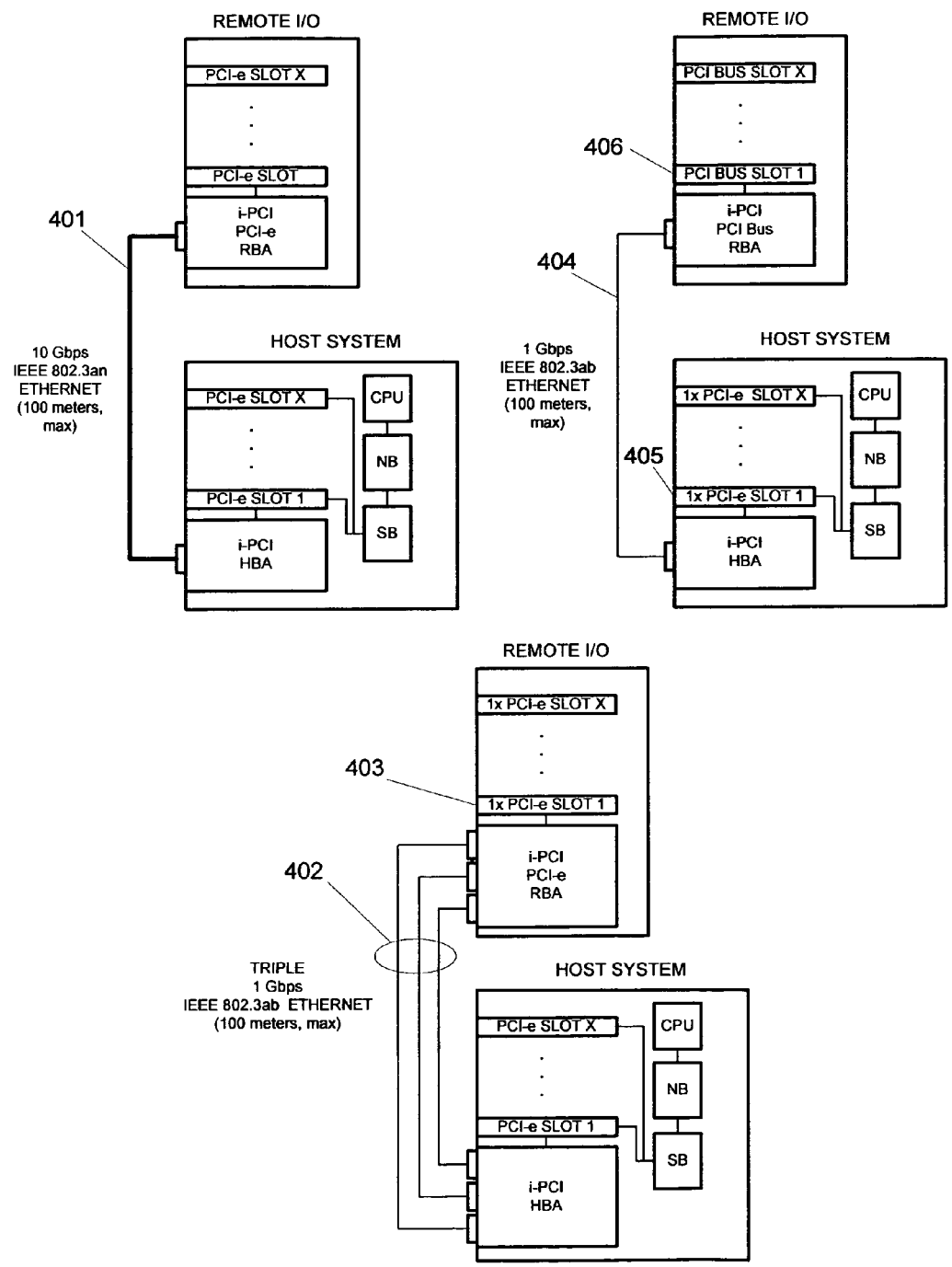
FIG. 4 is a block diagram of various direct physical connect i(dc)-PCI implementations, utilizing Ethernet CAT-x cables.
Figure 5:
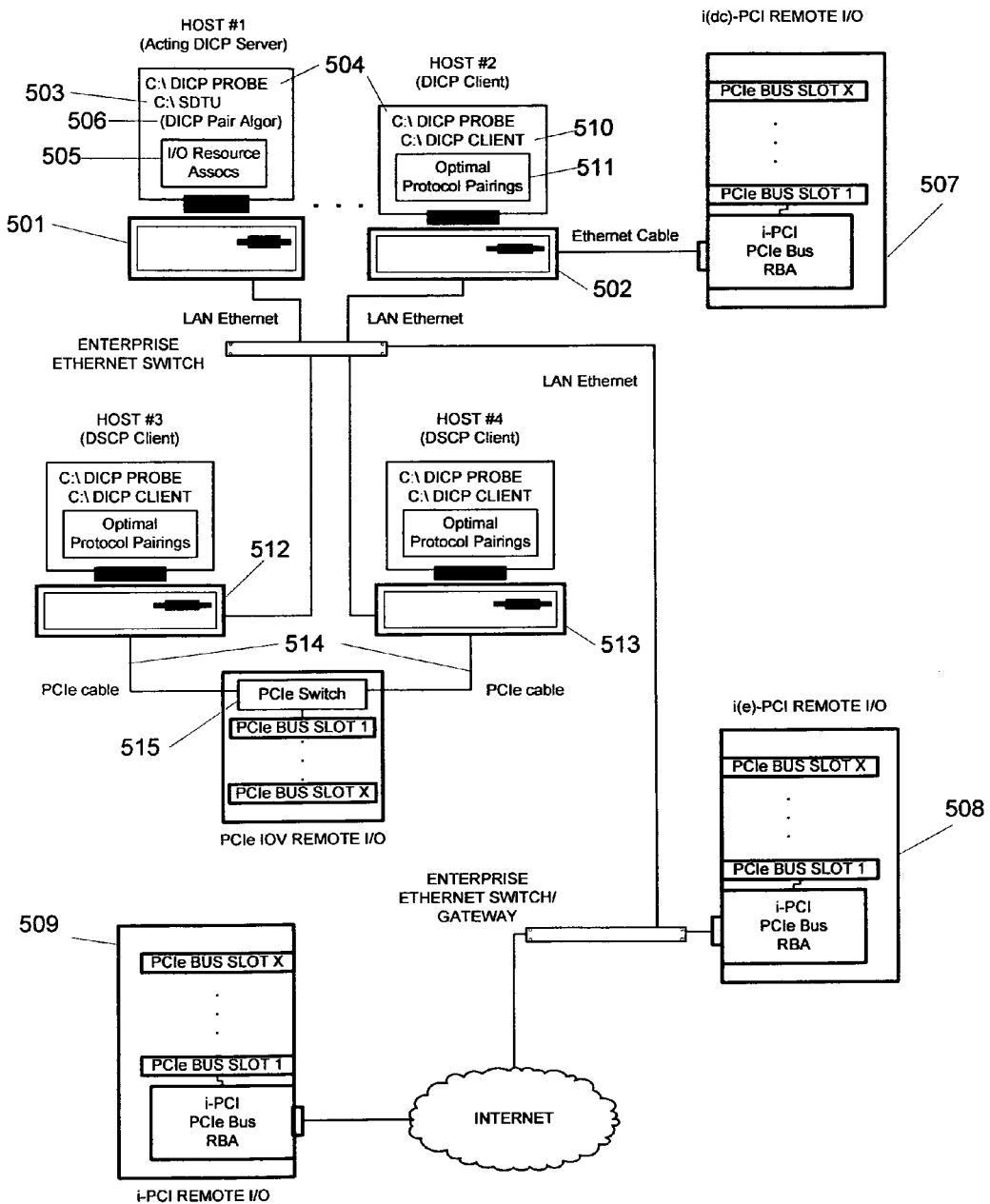
FIG. 5 is an illustration of a complete basic functionality Dynamic I/O Configuration Protocol (DICP) network environment.

Referring to FIG. 5, DICP consists of the following components and functions:

DICP Server: DICP includes both server and client roles. A given host may act as a DICP server [501] or client [502]. If there is no DICP server on a network at the time a host is added to a network, it by default becomes the DICP server. In one preferred embodiment, the DICP server function is installed on the server that is also managing the general network parameter assignments via a protocol such as DHCP. Thus the same server also determines and configures the I/O system resource virtualization protocols. If a host is set as a DICP server, first time configuration is accomplished via a System Data Transfer Utility (SDTU) [503].

DICP Probe Function: DICP Probe [504] is a simple network access utility that is engaged as part of the host boot-up sequence. DICP Probe sends out a broadcast on the LAN to determine if there are any other hosts already acting as a DICP server. If there is no response, it is assumed the host must also function as a DICP server and hands off execution to the System Data Transfer Utility [503].

System Data Transfer Utility (SDTU): The SDTU [503] is an installed software that is optionally engaged as part of the host boot-up sequence. If no DICP server is present on a network at the time a host is added to the network, that host, by default, assumes the DICP server role. A "No DICP Server" found message is communicated to the user and the System Data Transfer Utility is engaged to interact with the user. The SDTU creates a complete mapping table, referred to as the I/O System Resource Associations [505] of all network host and I/O system resource pairings. I/O system resources may be available at various locations on a network, including but not limited to i(dc)-PCI remote resources [507], i(e)-PCI remote resources [508], i-PCI remote resources [509] and multi-root PCIe IOV enabled resources shared between two hosts [512][513] via PCIe cables [514] and a PCIe switch [515]. The SDTU may use pre-configured default pairings as defined by the DICP Pairings Algorithm [506] or it optionally may allow administrator interaction or over-rides to achieve network or system configuration and optimization goals. Once the SDTU has been run, the host is then rebooted and the host then becomes the active DICP server. The DICP server then responds to probes from any other host system [502] on the network. Any other hosts subsequently added to the system would then discover the DICP server when they execute their Probe Function [504] and thus would configure themselves as a client.

I/O system resource Associations [505]: Associations between host and virtualized I/O system resource are established such that virtualization protocols may be engaged that are optimal. Multiple protocols may be engaged with one protocol associated with an I/O system resource and another protocol associated with another I/O system resource such that optimal data transfer is achieved for each host-to-resource pairing. FIG. 6 shows the construction of a table for the I/O system resource Associations.

DICP Client: DICP is executed as a precursor to session management. A host system [502] [512] [513], executing DICP as a client [510], determines the optimal virtualization protocol to use for a given data I/O system resource, based on the network topology settings stored in "I/O system resource Associations" [505] located on the DICP Server. The I/O system resource Association on the DICP Server is accessed by the DICP client [510] and the optimal protocol is configured for each I/O system resource device it is mapped to on the network. The locally stored configuration is referred to as the Optimal Protocol Pairings [511]. FIG. 7 shows the construction of the Protocol Pairings, which is simply a downloaded current subset of the I/O system resource Associations specific to that particular host—found on the DICP Server.

Figure 8:
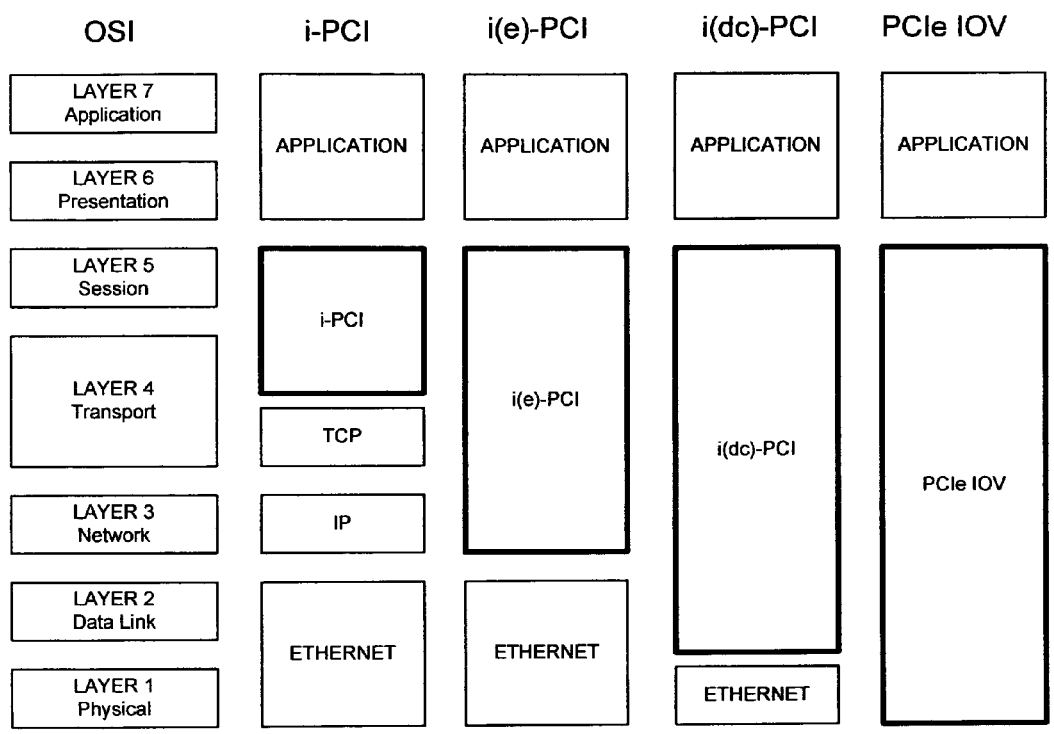
FIG. 8 shows the relationship of the various I/O Resource Virtualization protocols to the OSI layers.

DICP Pairings Algorithm [506]: The DICP pairings algorithm executes as a function within the SDTU software. The algorithm is based on a simple performance rule: To maximize performance, the protocol operating at the lowest OSI layer is selected. FIG. 8 shows the relationship of the various I/O system resource protocols to the OSI layers. Referring to FIG. 5 and FIG. 8, for example, if there is a PCIe cable connection [514] via a PCIe switch [515] to I/O resources, PCIe IOV is selected over i-PCI. In another example, a host and Remote I/O located on a peer port of the same Ethernet switch would be connected to via i(e)-PCI, rather than FIG. 9 details the simplified pseudo-code for the pairing algorithm for a single entry as a means of illustrating the concept.

Figure 10:
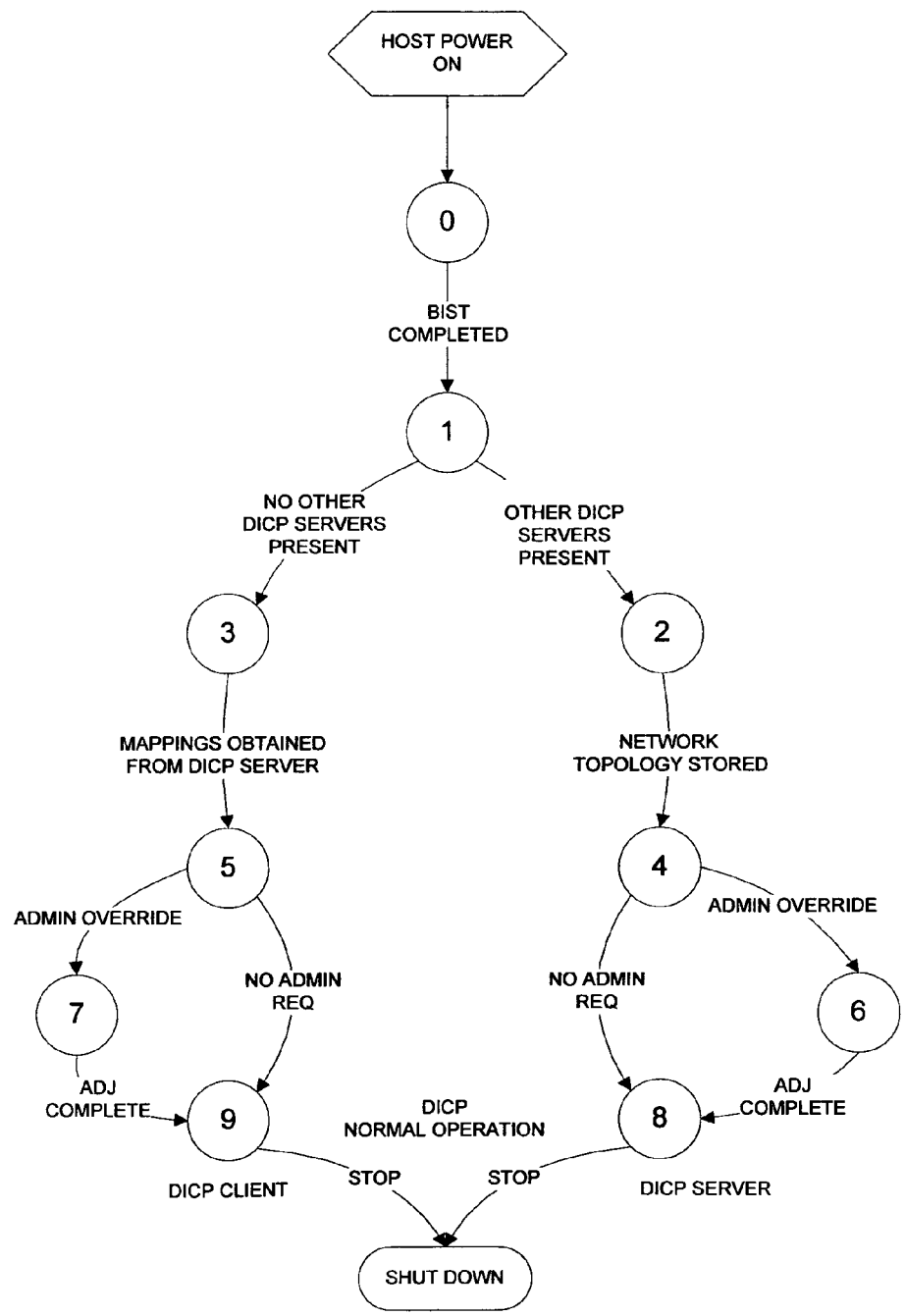
FIG. 10 shows a basic functionality DICP state machine for both client and server.

Referring to FIG. 10, a basic functionality DICP state machine for both client and server is shown.

FIG. 11 summarizes the state descriptions associated with the various DICP states illustrated in FIG. 10.

Throughout this application the virtualization of PCI as a base I/O system resource protocol is used to illustrate the concept of the invention. However, it is not intended to exclude other I/O system resource virtualization protocols. Rather, other present and emerging I/O system resource protocols may readily be included in the network topology and the pairing algorithm modified to be inclusive of these protocols.

Although the invention has been described with respect to a specific preferred embodiment, many variations and modifications will become apparent to those skilled in the art upon reading the present application. It is therefore the intention that the claims be interpreted as broadly as possible in view of the prior art to include such variations and modifications.

What is claimed is:

1. A method for detecting, associating, and establishing an optimal I/O system resource virtualization protocol between a host system and a virtualized I/O system resource on a network, comprising:

enabling a host system for network connectivity and analysis, where the host system is automatically configured as a protocol client or as both a protocol server and a protocol client, depending on the presence or absence of an existing protocol server;

enabling a utility configured to execute a network probing algorithm on the network; and enabling a software configuration function responsive to the utility and configured to assign one of a plurality of I/O system resource virtualization protocols as an optimal I/O system resource virtualization protocol for subsequent data transactions between the host system and the virtualized I/O system resource, wherein the assigned I/O system resource virtualization protocol is assigned as a function of an OSI layer associated with the plurality of virtualization protocols, where the plurality of I/O system resource virtualization protocols includes one of PCIe I/O Virtualization (IOV), i-PCI, i(e)-PCI, and i(dc)-PCI, wherein the host system automatic configuration is the result of various factors, including a topology of the network, location of the virtualized I/O system resource in relation to the topology, and the available I/O system resource virtualization protocols.

2. The method as specified in claim 1 wherein the utility is a software utility.

3. The method as specified in claim 1 wherein the utility is a firmware utility.

4. The method as specified in claim 1 wherein the utility is a logic utility.

5. The method as specified in claim 1 wherein the utility is configured to be engaged as part of a host boot-up sequence.

6. The method as specified in claim 1 wherein the utility is configured to send out a broadcast on a LAN to determine if there are any other hosts already acting as a server.

7. The method as specified in claim 6 wherein if there is no response to the broadcast, the host system operates as the server and hands off execution to a system data transfer utility.

8. The method as specified in claim 1 wherein the host system is configured as both a protocol server and a protocol client.

9. The method as specified in claim 1 wherein the host system is configured such that if no other host is detected on the network at the time the host system is added to a network, the host system is configured to become a server.

10. The method as specified in claim 1 wherein the host system is configured on a server that is also configured to manage general network parameter assignments via a protocol.

11. The method as specified in claim 7 wherein the system data transfer utility is configured to create a mapping table of all network host and I/O system resource pairings.

12. The method as specified in claim 7 wherein the system data transfer utility may use pre-configured default pairings as defined by a pairing algorithm, or optionally may allow administrator interaction or over-rides to achieve network or system configuration and optimization goals.

13. The method as specified in claim 1 wherein the host system is configured as a protocol client, and the host system is configured to execute as a precursor to session management.

14. The method as specified in claim 1 wherein the host system is configured as a protocol client, and the host system is configured to determine the optimal I/O system resource virtualization protocol to use for data I/O system resource based on network topology settings stored in a server.

15. The method as specified in claim 14 wherein the network topology settings are configured to map the optimal I/O system resource virtualization protocol for each I/O system resource mapped on the network.

16. The method as specified in claim 1 wherein the assigned I/O system resource virtualization protocol has the lowest associated OSI layer.

* * * * *